July 16, 1968  E. A. JACKSON  3,392,698

BEARING FINDER FOR AIRCRAFT LANDING PATTERNS

Filed May 17, 1965

INVENTOR.
EDWARD A. JACKSON
BY Seidel & Gonda

ATTORNEYS.

United States Patent Office 3,392,698
Patented July 16, 1968

3,392,698
BEARING FINDER FOR AIRCRAFT
LANDING PATTERNS
Edward A. Jackson, Willow Brook Farm,
Line Lexington, Pa. 18932
Filed May 17, 1965, Ser. No. 456,440
6 Claims. (Cl. 116—129)

ABSTRACT OF THE DISCLOSURE

A landing pattern bearing finder for a compass is provided having an azimuth scale and a plurality of bearing scales. The bearing scales indicate right and left 45 or 90 degree turns and are mounted for rotation with the azimuth scale. Some of the bearing scales may be selectively obscured by a shutter means.

---

This invention relates generally to directional finders, and in particular, to a bearing finder for aircraft landing patterns.

Present day flight regulations, prescribed by the FAA, require properly executed procedure turns prior to the landing of an aircraft. The normal landing pattern requires a 45° angle of intercept to a heading which is parallel and opposite to the ultimate landing direction. The pattern then requires two 90° turns which properly orient the aircraft for landing. The period during the approach and landing of an aircraft is most critical requiring the utmost attention and concentration by the pilot. A calculation by the pilot during this critical and busy period, of landing pattern bearings, mentally or otherwise, may very likely be subject to error. The present invention provides a long awaited solution for this problem.

Therefore, to overcome the foregoing and other difficulties of the prior art, a general object of this invention is to eliminate error and promote safety during the landing of an aircraft.

It is an object of this invention to provide an accurate finder of bearings for procedural turns of a landing pattern.

Another object is to provide a bearing finder which may be quickly and accurately read without a confusion of readings.

A further object is the provision of a bearing finder which is simple to read and associated on the same dial as the azimuth heading indication.

A further object is to provide a bearing finder which is economical to produce and which utilizes conventional, currently available components that led themselves to standard mass production manufacturing techniques.

Other objects will appear hereinafter.

For the purpose of illustrating the invention, there is shown in the drawings a form which is presently preferred; it being understood, however, that this invention is not limited to the precise arrangements and instrumentalities shown.

Other objects and a fuller understanding of the invention may be had by referring to the following description and claims, taken in conjunction with accompanying drawings in which:

Figure 1:
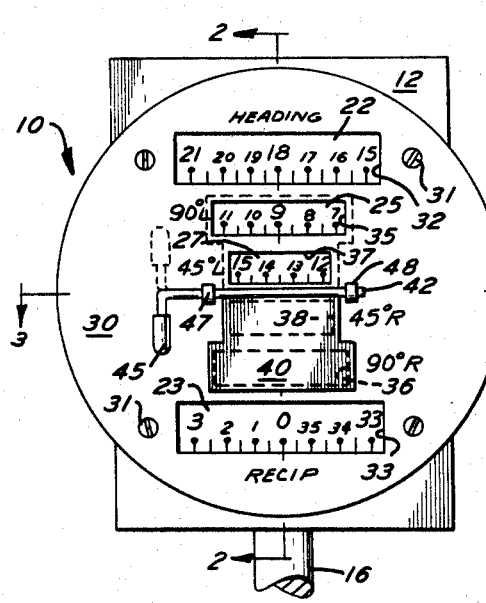
FIGURE 1 is a front elevational view showing the bearing finder of the present invention.

Referring to the drawings in detail wherein like numerals indicate like elements, there is shown in FIGURE 1 a drawing of the landing pattern bearing finder of the present invention designated generally as 10. The bearing finder 10 is an indicating dial enclosed within a housing 12. An opening 13 is provided at one side of the housing 12. The rectangular shape of housing 12 is only a typical shape, it being understood that many suitable shapes for the housing 12 are available. A drum member 14 of lightweight, low mass material is provided within the housing 12. As illustrated, the drum 14 is supported by an axial shaft 16 which is journaled in a bushing 18 at the bottom of housing 12. A cylindrical dial 20 is affixed around the periphery of the drum member 14. The drum member 14 is free to rotate, since there is sufficient clearance between the dial 20 and the housing 12. The shaft 16 is coupled to a direction indicating device, such as a gyro compass of conventional construction (not shown). The gyro may, if desired, be encompassed within the drum 14.

Figure 2:
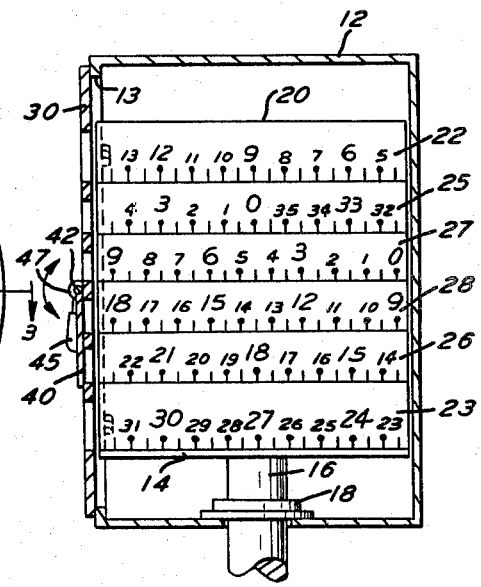
FIGURE 2 is a side cross-sectional view of FIGURE 1 taken along line 2—2.
Figure 3:
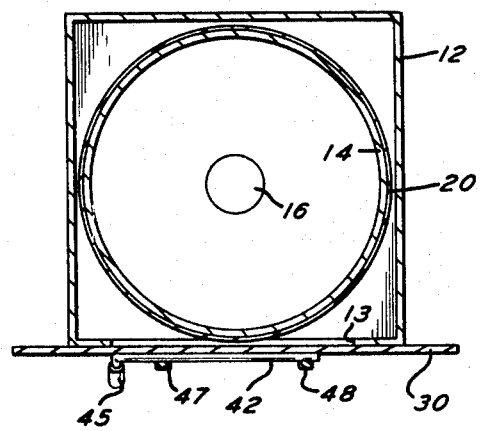
FIGURE 3 is a cross-sectional plan view taken along line 3—3 of FIGURE 1.

The cylindrical dial 20 of the gyro compass has an azimuth scale 22 for indications of the aircraft heading. A plurality of bearing scales 23, 25, 26, 27, 28 are provided on the dial 20 below the azimuth scale 22 which has been extended for this purpose as is illustrated best in FIGURE 2. The four quadrants of direction, reading from zero to 360°, are provided on each of the bearing scales. However, each of the bearing scales 23, 25, 26, 27, 28 is displaced relative to the azimuth scale 22 by a predetermined arc of the cylindrical dial 20. The scale 23 is a reciprocal of the azimuth scale 22 and is the most remote of the bearing scales from the azimuth scale 22. The first two of the bearing scale 25, 26 are both displaced by a quadrant of arc of the cylindrical dial 20. The scales 25, 26 are also reciprocals of each other. The remaining two scales 27, 28 are displaced relative to the azimuth scale 22 by 45° of arc of the cylindrical dial 20. The scales 27, 28 have a displacement apart relative to each other of 90° of arc. The scales corresponding to a left turn pattern, i.e., scales 25, 27 read less than the azimuth scale 22 by the amount of arc they are displaced. Accordingly, the scales 26, 28 correspond to a right turn pattern and read more than the azimuth scale 22 by an amount equal to their respective displacements.

A masking face 30 is provided to cover the opening 13 and the cylindrical dial 20. The masking face 30 is attached to the housing 12 by suitable means such as machine screws 31. Separate windows 32, 33, 35, 36, 37, 38 are provided in the face 30 for viewing each of the scales 22, 23, 25, 26, 27, and 28, respectively. The windows 32, 33 are equal in size, the largest and most remote of all the windows and correspond to the azimuth scale 22 and the reciprocal scale 23, respectively. The windows 35, 36 correspond to bearing scales for 90 degrees turn patterns and are juxtaposed to the larger windows 32, 33, as shown. The equal and smallest windows 37, 38 correspond to 45° turn patterns and are juxtaposed at the center of face 30 between the aforementioned windows.

A shutter flap 40 is provided to selectively blind either the right or left turning pattern windows, alternatively. The shutter flap 40 is of appropriate size and shape and is fastened along one edge to a rod 42. The rod 42 is journaled to turn within the bearings 47, 48. A right angled turn of rod 42 provides a convenient handle 45. The rod 42 may tightly fit within the bearings 47, 48 so that the flap 40 will remain at whatever position set. Alternatively, a spring biasing means (not shown) to alternately position the flap 40 may be provided.

The simple bearings and headings, shown as example readings on the drawings, will be utilized to demonstrate the bearing finder device of the present invention. Directional heading of the aircraft may be readily obtained by a reading in window 32 of the azimuth scale 22 as being 18 (180° or South). The reciprocal of the heading is found by reference to window 33 and scale 23 which shows a bearing 0 (0° or North). If a bearing for a 90° left turn pattern is desired, the pilot reads the bearing 9 (90° or East) in the window 35 on scale 25. The aircraft is turned until the new heading 9 is read on the azimuth scale 22 in window 32. If a bearing for a 45° left turn pattern is desired at any time such as when a landing pattern requires this turn before entering the reciprocal heading, the pilot refers to the scale 27 in window 37.

The bearings for right turn patterns may be obtained by uncovering the windows 36, 38 by flipping the handle 45 upward. The shutter flap 40 will then cover the windows 35, 37 as indicated by the dashed lines in FIGURE 1. Since the bearings for both left turn patterns and right turn patterns are not visible at the same time there can be no confusion between left turn pattern bearings and right turn pattern bearings. Additionally, the varied sizes of the windows in face 30 make it unlikely to confuse a 45° bearing with a 90° bearing or with a reciprocal bearing. Thus, it is not necessary for the pilot to do any mental calculations during landing or take-off. The present invention may be readily substituted for the azimuth scale of an existing gyro compass in aircraft or may be installed in new aircraft.

The present invention may be embodied in other specific forms without departing from the spirit or essential attributes thereof and, accordingly, reference should be made to the appended claims, rather than to the foregoing specification as indicating the scope of the invention.

I claim:

1. A landing pattern bearing finder for a compass comprising a cylindrical indicating dial, said dial having an azimuth scale and a plurality of bearing scales, each of said bearing scales being displaced relative to said azimuth scale by a predetermined arc of said dial, a masking face covering said dial, said face having separate windows for each of said azimuth scale and bearing scales, a shutter means adjacent said face for selectively obscuring only some of said bearing scales without interfering with observance of the remainder of the bearing scales and said azimuth scale, and said bearing scales obscured by said shutter means being displaced in the same direction with respect to said azimuth scale.

2. A bearing finder in accordance with claim 1 wherein two of said bearing scales are displaced 45 degrees with respect to said azimuth scale and are displaced 90 degrees with respect to each other, said shutter means being positioned to alternatively obscure only one of said last two mentioned bearing scales.

3. A landing pattern bearing finder for a compass comprising a cylindrical indicating dial, said dial having an azimuth scale and a plurality of bearing scales, each of said bearing scales being displaced relative to said azimuth scale by a predetermined arc of said cylindrical dial, a masking face covering said dial, said face providing windows for said azimuth scale and bearing scales, a shutter means for selectively blinding some of said bearing scales to facilitate a reading of said dial, one of said bearing scales being a reciprocal of said azimuth scale, two of said bearing scales being displaced relative to said azimuth scale by a quadrant of arc of said cylindrical dial and being reciprocal to each other, another two of said bearing scales being displaced relative to said azimuth scale by 45 degrees of arc of said dial, said last two-mentioned bearing scales being displaced in relation to each other by 90 degrees of arm of said dial.

4. A landing pattern bearing finder for a gyro-compass comprising a cylindrical indicating dial for said compass, said dial having an azimuth scale and a plurality of bearing scales, one of said bearing scales being a reciprocal of said azimuth scale, two of said bearing scales being displaced relative to said azimuth scale by a quadrant of arc, said two scales being reciprocals of each other for a right and left turn pattern, respectively, and a masking face covering said dial, said face having windows for said azimuth scale and said bearing scales, said windows being of various sizes to clearly indicate scales corresponding to said windows, and another two of said bearing scales being displaced relative to said azimuth scale by an arc of 45 degrees, said last two mentioned scales being displaced in relation to each other by an arc of 90 degrees for right and left turn patterns, respectively.

5. A landing pattern bearing finder for a gyro-compass comprising a cylindrical indicating dial for said compass, said dial having an azimuth scale and a plurality of bearing scales, one of said bearing scales being a reciprocal of said azimuth scale, said one bearing scale being the most remote of the bearing scales from said azimuth scale, two of said bearing scales being displaced relative to said azimuth scale by a quadrant of arc, said two scales being reciprocals of each other for a right and left turn pattern, respectively, and a masking face covering said dial, said face having windows for said azimuth scale and said bearing scales, said windows being of various sizes to clearly identify scales corresponding to said windows, said one bearing scale and said azimuth scale having windows of equal size and larger than the remaining of said windows.

6. A landing pattern bearing finder for a gyro compass comprising a cylindrical indicating dial for said compass, said dial having an azimuth scale and five bearing scales, one of said bearing scales being a reciprocal of said azimuth scale, said one scale being most remote of said bearing scales from said azimuth scale, a first two of said bearing scales being displaced relative to said azimuth scale by a quadrant of arc, said first two scales being reciprocals of each other for a right and left turn pattern, respectively, said first two scales being between said azimuth and one of said bearing scales, and a remaining two of said bearing scales, each being displaced relative to said azimuth scale by an arc of 45 degress and relative to each other by an arc of 90 degrees for a right and left turn pattern, respectively, said remaining two scales being between said first two scales, a masking face covering said dial, said face providing various sizes of windows for said azimuth scale and bearing scales, said windows of said azimuth and said one of said bearing scales being equal and largest of said windows, said windows of said first two scales being equal and said windows of said remaining two scales being equal and smallest of said windows, said various sizes clearly identifying corresponding of said scales, and a shutter flap pivoted on said face between said smallest windows, said flap being of sufficient area to simultaneously blind two of said windows to present 45 degree and 90 degree bearings for either a right, and alternatively, a left turn pattern.

References Cited

UNITED STATES PATENTS 2,335,876    12/1943    Olshevsky    33—204
2,561,332    7/1951    Beach et al.    116—129

DAVID SCHONBERG, *Primary Examiner.*

LOUIS R. PRINCE, *Examiner.*

J. W. ROSKOS, *Assistant Examiner.*